US009577884B2

(12) United States Patent
Kumar et al.

(10) Patent No.: US 9,577,884 B2
(45) Date of Patent: Feb. 21, 2017

(54) ENTERPRISE QUALITY ASSURANCE AND LAB MANAGEMENT TOOL

(71) Applicant: BANK OF AMERICA CORPORATION, Charlotte, NC (US)

(72) Inventors: Vivek Kumar, New Delhi (IN); Sushil Kumar, Haryana (IN); Hitendra Kumar, Uttar Pradesh (IN)

(73) Assignee: Bank of America Corporation, Charlotte, NC (US)

( * ) Notice: Subject to any disclaimer, the term of this patent is extended or adjusted under 35 U.S.C. 154(b) by 142 days.

(21) Appl. No.: 14/588,429

(22) Filed: Jan. 1, 2015

(65) Prior Publication Data

US 2016/0197771 A1    Jul. 7, 2016

(51) Int. Cl.
*H04L 12/24*    (2006.01)
(52) U.S. Cl.
CPC ......... *H04L 41/082* (2013.01); *H04L 41/0853* (2013.01); *H04L 41/0866* (2013.01)
(58) Field of Classification Search
None
See application file for complete search history.

(56) References Cited

U.S. PATENT DOCUMENTS

| | | | | |
|---|---|---|---|---|
| 5,394,382 A * | 2/1995 | Hu | ................... | G11B 20/1258 360/73.03 |
| 5,937,201 A * | 8/1999 | Matsushita | ........... | G06F 9/4405 709/223 |
| 6,282,709 B1 * | 8/2001 | Reha | ........................ | G06F 8/65 717/175 |
| 7,099,027 B1 * | 8/2006 | Barry | .................... | G06F 3/1212 358/1.15 |
| 7,240,111 B2 * | 7/2007 | VanHarlingen | ......... | G06F 3/023 348/14.07 |
| 7,269,625 B1 * | 9/2007 | Willhide | ............. | H04L 43/0817 707/999.01 |
| 7,447,153 B2 * | 11/2008 | Klinker | ............... | H04L 12/4633 370/231 |
| 7,599,947 B1 * | 10/2009 | Tolbert | ............. | G06F 17/30917 |
| 7,898,959 B1 * | 3/2011 | Arad | ...................... | H04L 45/00 370/235 |

(Continued)

*Primary Examiner* — Ninos Donabed
(74) *Attorney, Agent, or Firm* — Michael A. Springs; Moore & Van Allen PLLC; Peter B. Stewart (57) ABSTRACT

Embodiments of the invention are directed to a system, method, or computer program product for configuring multiple computing devices over a network using a single software application. Each of the multiple computing devices may be accessible over a network. The invention links each of the multiple computing devices to the single software application. The invention determines commands which are executable by each of the multiple computing devices to configure each of the multiple computing devices. The invention further communicates the commands based on receiving user input in the single software application. The invention then determines whether each of the multiple computing devices were correctly configured. The invention may further track the configuration process of the devices using tests and procedures. The invention tracks information related to the configuration of the devices and displays such information in report form as a result of receiving a report request in the single software application.

17 Claims, 6 Drawing Sheets

(56) References Cited

U.S. PATENT DOCUMENTS

| | | | | |
|---|---|---|---|---|
| 8,190,760 B2* | 5/2012 | Hurst | H04N 21/4325 | 709/231 |
| 8,214,494 B1* | 7/2012 | Slavin | G08B 25/08 | 709/203 |
| 8,438,544 B2* | 5/2013 | Kraft, IV | G06F 8/71 | 717/103 |
| 8,473,396 B2* | 6/2013 | Hausman | G06Q 10/10 | 705/35 |
| 8,914,406 B1* | 12/2014 | Haugsnes | H04L 63/1441 | 382/305 |
| 9,298,501 B2* | 3/2016 | Excoffier | H04L 41/082 | |
| 9,391,475 B2* | 7/2016 | Mayer | H02J 13/002 | |
| 2002/0124100 A1* | 9/2002 | Adams | G06F 17/30902 | 709/232 |
| 2003/0090980 A1* | 5/2003 | Kashihara | G11B 7/0062 | 369/53.31 |
| 2003/0140121 A1* | 7/2003 | Adams | G06F 17/30902 | 709/219 |
| 2004/0088504 A1* | 5/2004 | Hsu | G06F 3/0613 | 711/158 |
| 2005/0138265 A1* | 6/2005 | Nguyen | G11B 27/105 | 711/4 |
| 2005/0144332 A1* | 6/2005 | Nellitheertha | G06F 9/4881 | 710/15 |
| 2005/0249199 A1* | 11/2005 | Albert | H04L 67/1002 | 370/352 |
| 2005/0278444 A1* | 12/2005 | Sims | H04L 67/14 | 709/224 |
| 2006/0020749 A1* | 1/2006 | Waldvogel | G06F 3/061 | 711/112 |
| 2006/0069776 A1* | 3/2006 | Shim | H04L 67/1008 | 709/225 |
| 2007/0015498 A1* | 1/2007 | Giacalone | H04L 29/06 | 455/418 |
| 2007/0064337 A1* | 3/2007 | Aoki | G11B 7/08505 | 360/78.04 |
| 2007/0198750 A1* | 8/2007 | Moilanen | G06F 9/5083 | 710/6 |
| 2007/0255844 A1* | 11/2007 | Shen | H04L 12/00 | 709/231 |
| 2008/0062562 A1* | 3/2008 | Kaneko | G11B 27/32 | 360/135 |
| 2008/0084819 A1* | 4/2008 | Parizhsky | H04L 47/10 | 370/230 |
| 2008/0224834 A1* | 9/2008 | Oosaka | G05B 15/02 | 340/286.02 |
| 2008/0239991 A1* | 10/2008 | Applegate | H04L 41/5009 | 370/254 |
| 2008/0307415 A1* | 12/2008 | Carter | G06F 9/44505 | 718/1 |
| 2008/0320217 A1* | 12/2008 | Levine | G06F 3/0611 | 711/112 |
| 2009/0199298 A1* | 8/2009 | Miliefsky | G06F 21/305 | 726/25 |
| 2010/0017252 A1* | 1/2010 | Chaar | G06Q 10/06 | 705/7.12 |
| 2010/0050008 A1* | 2/2010 | Allalouf | G06F 1/32 | 713/340 |
| 2010/0169477 A1* | 7/2010 | Stienhans | G06F 9/5083 | 709/224 |
| 2010/0268783 A1* | 10/2010 | Mizosoe | G06Q 10/107 | 709/206 |
| 2011/0040893 A1* | 2/2011 | Karaoguz | H04L 67/2847 | 709/242 |
| 2011/0125895 A1* | 5/2011 | Anderson | H04L 43/028 | 709/224 |
| 2011/0211463 A1* | 9/2011 | Matityahu | H04L 9/3213 | 370/252 |
| 2011/0252096 A1* | 10/2011 | Ramaswamy | H04L 41/12 | 709/206 |
| 2011/0288692 A1* | 11/2011 | Scott | G06F 21/55 | 700/297 |
| 2012/0185588 A1* | 7/2012 | Error | G06Q 30/02 | 709/224 |
| 2012/0185913 A1* | 7/2012 | Martinez | G06F 9/455 | 726/1 |
| 2013/0003735 A1* | 1/2013 | Chao | H04L 45/66 | 370/392 |
| 2013/0103816 A1* | 4/2013 | Morley | G06Q 10/00 | 709/223 |
| 2013/0166490 A1* | 6/2013 | Elkins | G06N 5/022 | 706/47 |
| 2013/0173137 A1* | 7/2013 | Sukumaran | F02D 41/22 | 701/102 |
| 2013/0304850 A1* | 11/2013 | Mahaffey | H04L 41/0253 | 709/217 |
| 2014/0074911 A1* | 3/2014 | Park | H04L 65/602 | 709/203 |
| 2014/0092738 A1* | 4/2014 | Grandhi | H04L 47/52 | 370/235 |
| 2014/0280810 A1* | 9/2014 | Gabrielson | H04L 41/0806 | 709/222 |
| 2014/0304333 A1* | 10/2014 | Tredoux | H04L 67/16 | 709/204 |
| 2014/0325349 A1* | 10/2014 | Riherd | G06F 9/4443 | 715/255 |
| 2014/0362705 A1* | 12/2014 | Pan | H04L 47/125 | 370/237 |

* cited by examiner

MACHINES

| NAME 402 | MAC 404 | IP 406 | ASSIGNMENT 408 | TESTER 410 | COMMENTS 412 | RDP 414 | STATUS 416 |
|---|---|---|---|---|---|---|---|
| NAME #1 | MAC ADDRESS #1 | IP ADDRESS #1 | MANAGER #1 | TECH #1 | ENVIRONMENT A | RDP | ● |
| NAME #2 | MAC ADDRESS #2 | IP ADDRESS #2 | MANAGER #2 | TECH #2 | ENVIRONMENT B | RDP | ○ |
| NAME #3 | MAC ADDRESS #3 | IP ADDRESS #3 | MANAGER #3 | TECH #3 | ENVIRONMENT C | RDP | ○ |
| NAME #4 | MAC ADDRESS #4 | IP ADDRESS #4 | MANAGER #4 | TECH #4 | ENVIRONMENT D | RDP | ● |

ENGAGEMENT REPORT GENERATOR

| SELECT A DATE 502 | DATE 1 | DATE 2 | REPORT TYPE 504 | SEARCH 506 | RESET 508 |
|---|---|---|---|---|---|

ENTERPRISE QUALITY ASSURANCE AND LAB MANAGEMENT TOOL

BACKGROUND

Businesses utilize computers and servers for handling the load of many business processes. Setting up a computer or server to handle the business processes may consume a large amount of work time. Automating the process of setting up the computers and servers is one way to reduce the amount of time actually spent but at the cost of generating errors that may affect the ability of the computer or server to perform the process. It is necessary to monitor the installation process of the computers and server to ensure costly errors are minimized.

BRIEF SUMMARY

Embodiments of the present invention address the above needs and/or achieve other advantages by providing apparatuses (e.g., a system, computer program product and/or other devices) and methods for a configuring multiple computing devices on a network using a single software application.

In some embodiments of the invention, the system is configured to identify the multiple computing devices over the network. Each of the computing devices is accessible over the network using a communication module. The communication module allows the computing device to communicate with at least the other computing devices on the network and the system. Each computing device in the computing devices comprises a hardware configuration. The configuration of one computing device may be different than another.

In some embodiments, the system links each of the computing devices to the single software application. The single software application comprises a feature to communicate an instruction to configure each of the computing devices;

In some embodiments, the system receives an instruction to configure each of the multiple computing devices based on user input in the single software application.

In some embodiments, upon receiving the instruction, the system determines commands that are executable by each of the multiple computing devices to configure each of the multiple computing devices. Determining the commands is based on the instruction received from the user to configure each of the multiple computing devices and the hardware configuration associated with each of the multiple computing devices.

In some embodiments of the invention, the system determines criteria that indicate whether a computing device has been correctly configured. The criteria may be used by the system to compare against expected responses from each of the multiple computing devices after the computing device has executed the commands.

In some embodiments, after determining the commands, the system may communicate the commands to each of the multiple computing devices to configure each of the multiple computing devices.

In some embodiments, based on communicating the commands, the system receives a status regarding configuration from each of the multiple computing devices based on communicating the commands.

Based on receiving the status of the configuration, the system compares the status of the configuration of each of the multiple computing devices with the criteria.

In some embodiments, the system determines whether each of the multiple computing devices was configured correctly based on comparing the status of the configuration of each of the multiple computing devices with the criteria.

In some embodiments, the system provides a viewable indication on the single software application of whether each of the multiple computing devices was configured correctly.

In other embodiments, the system is further configured to receive an indication that one or more of the multiple computing devices generated a configuration error during the configuration of the multiple computing devices, identify a technician for correcting the configuration error and electronically communicate the error to the technician.

In other embodiments of the invention, the system presents an option to connect to a computing device of the multiple computing devices via the single software application, receive a request to connect to the computing device, and create a connection to the computing device based on receiving the request.

In yet other embodiments, the system is further configured to authenticate the user. Additionally, where the system is configured for presenting the single software application, presenting the single software application is based on authenticating the user.

In other embodiments, each computing device of the multiple computing devices comprises a computing device identification. Additionally, the system is configured to identify each of the multiple computing devices is based on the computing device identification.

In yet other embodiments, the multiple computing devices are preconfigured to perform a function and the instruction further comprises additional criteria to determine that the ability of each of the multiple computing devices to perform the function after being configured. Based on such, the system may further be configured to receive status of the ability of each of the multiple computing devices to perform the function, and compare the additional criteria with the ability of the computing device to perform the function.

In other embodiments, a first computing device of the multiple computing devices comprises an operating environment that is different than that of a second computing device of the multiple computing devices. Additionally, the instruction code for sending commands further comprise a first set of commands for configuring the first computing device and a second set of commands for configuring the second computing device based on the difference in the operating environments.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that remotely configure computing devices over a network.

Some portions of this disclosure are written in terms of a financial institution's unique position with respect to user transactions. As such, a financial institution may be able to utilize its unique position to create and configure and update remote computing devices over a network.

The term "computing device" used herein shall refer to any computing device comprising a communication device, some form of memory, and a processing device communicably coupled to the communication device and the memory. The communication device is capable of communicating to other computing devices over a network and capable of receiving commands that may be stored in the memory and executable by the processor. In some embodiments, the communication device communicates with other computing devices using a wired connection. In other embodiments the communication device communicates over a wireless connection.

The memory of the computing device may be configured with code which is executed by the processor. One executable portion of code stored in memory of the computing device may direct the computing device to receive a remote command through the communication device. After receiving the remote command, the processing device may execute the remote command. In some embodiments, the processing device may store the remote command in memory prior to executing the remote command. Further, in some embodiments, the remote command may comprise source code and the processing device may execute a compiler in order to compile the source code into machine code capable of being executed by the processor directly. After compiling the source code, the processor may then execute the code. In other embodiments, the remote code may be a script and the computing device may have stored in memory an interpreter capable of executing the script. The processing device may execute the interpreter which interprets the script.

Figure 1:
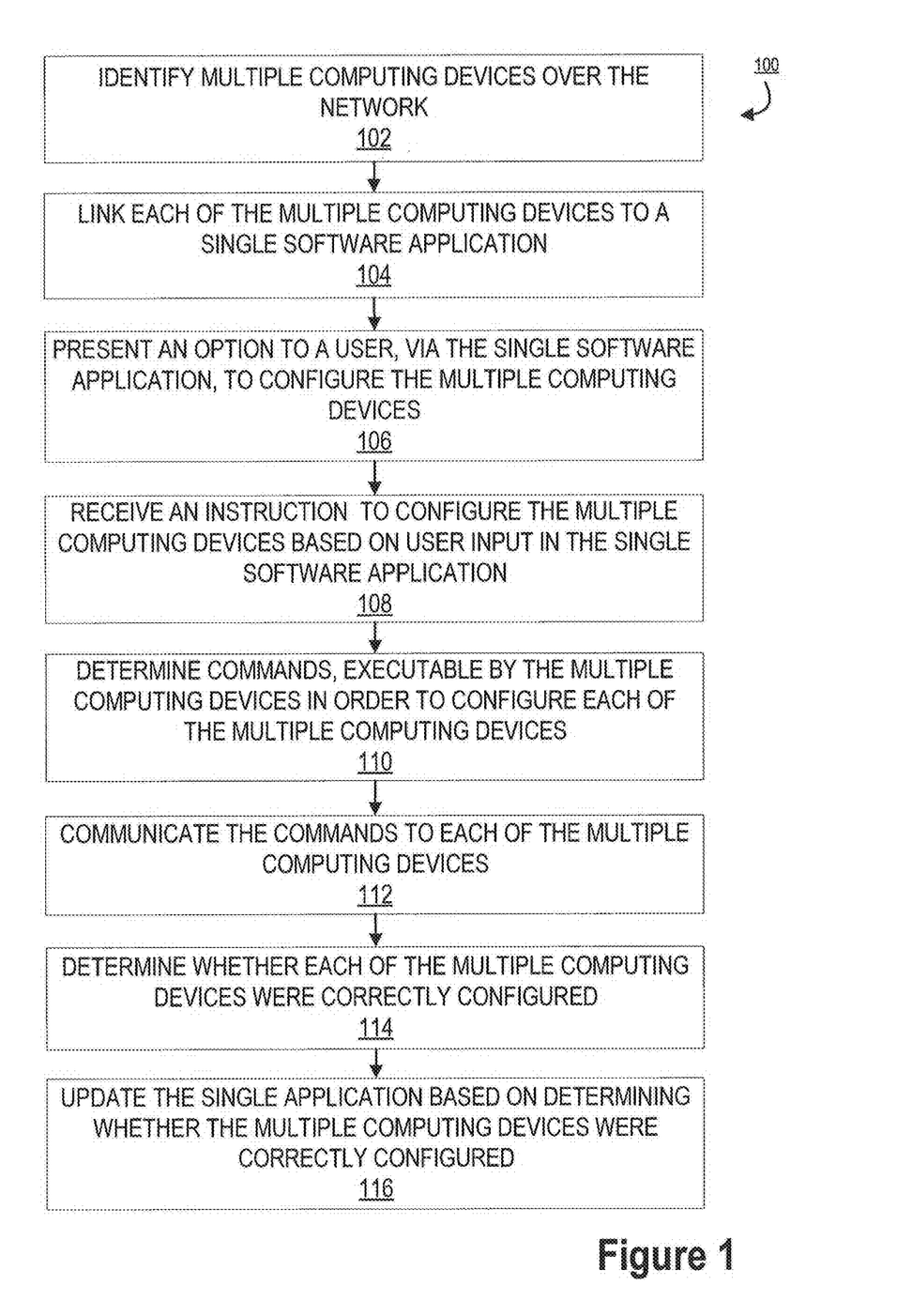
FIG. 1 provides a high level process flow illustrating the configuration of multiple computing devices over a network using a single application.

FIG. 1 provides a high level process flow illustrating a configuration system for configuring multiple computing devices over a network, in accordance with one embodiment of the present invention. First, as illustrated in block 102, the system of the invention identifies multiple computing devices over a network. In some embodiments of the invention, the multiple computing devices are accessible over the network. The multiple computing devices may comprise a communication device that will allow them communicate over the network. In some embodiments, each computing device in the multiple computing devices may communicate with the other computing devices on the network. In other embodiments, the multiple computing devices may be further configured to communicate with other devices that are not a part of the network.

The computing devices may both transmit and receive data over the network. In some embodiments, the each computing device in the multiple computing devices may be configured with a routine to provide identification of the device. This identification may comprise a computing device identification such as a serial number, an IP address, MAC address or the like. In other embodiments, the computing device identification may further comprise information related to architecture of the computing device. For example, the computing device may transmit information relating to the hardware components installed within the computing device such as the amount of RAM, the type of processor, whether a video card is installed, and the like. In other embodiments, the computing device may also transmit information related to the software and routines installed and running on the computing device. This may include, but is not limited to, the operating system, BIOS, boot loaders, scripting engines, daemons, scripts, subroutines, applications, and the like.

A computing device transmitting its identification may be a result of the computing device receiving a request via an identification application running on the computing device, where the request is to transmit the information. The identification application may be configured to receive requests over the network using the communication device. Upon receiving the request, the device may communicate the response.

Next, as illustrated in block 104, the system continues by linking each of the multiple computing devices together to a single software application. After the system receives the list of the multiple computing devices on the network. The system may link each of the computing devices to the one single software application. The single software application may be a web based application which is accessible over the network. In some embodiments, the system may comprise and execute a web server, wherein the single software application is accessible using the web server. The single software application may display information related to each computing device in the multiple computing devices. This may include the identifiable information associated with each computing device discussed above and in other parts of this application. The application may also link functions to the multiple computing devices and display a method for executing the functions within the application. These functions may include a code for configuring the computing devices, for remotely accessing each of the multiple computing devices remotely, for starting up or shutting down each of the multiple computing devices, and the like. Where the function is to remotely access one of the multiple computing devices, this may be done using Telnet, SSH, Remote Desktop Protocol, virtual network computing, desktop sharing, and the like. The function for configuring each of the multiple computing devices is represented by block 106 of the method 100.

As illustrated in block 108, the system receives an instruction to configure the multiple computing devices. This may be as a result of a user selecting the option to execute the function on the single software application. In such an embodiment, the single software application may provide a list of the computing devices that are connected to the single software application. The user may select from the list which computing devices to configure. Additionally, the single software application may further include a list of configurations for configuring the computing devices. A user would be able to select the computing devices and the configurations for the computing devices. For example, a single software application may present a list of computing devices to a user and a configuration list allowing the user to configure a computing device with a web application. The user may select one or more computing devices from the list of computing devices and then select the web application from the list of configurations. After selecting the configuration, the user may then submit the request to the system.

Next in block 110, the system determines commands, executable by the multiple computing devices in order to configure the multiple computing devices. The system may determine such commands based on the hardware or software architecture of each of the multiple computing devices. The system may also determine whether each of the multiple computing devices comprises the necessary dependencies for each computing device to be properly configured. The dependencies may be related to the hardware architecture of the computing device (i.e. processor, memory, etc.), or the software architecture of the computing device.

After the system determines the commands for configuring the multiple computing devices as illustrated in block 110, the system of the invention communicates the commands to the multiple computing devices. Based on receiving the request, the system determines the multiple computing devices that need to be configured. The system may analyze each of the multiple computing devices to determine how to configure the computing device. Such an analysis may include analyzing the hardware of the computing device. Additionally, the system may analyze the operating system, and the applications and functions that are installed or being executed on the computing device. The system may further analyze the system parameters associated with the computing device, which may include but are not limited to the processor load, available memory, memory usage, data storage capacity, network capacity and the like. For example, the system may receive a request to install a web application on a computing device using a given port of the computing device. The system may determine whether the port of the computing device is in user or whether there is another application installed that would use such a port on the computing device. The system may further determine whether the system has installed the required dependencies for the application. Depending on this analysis, the system may determine the commands necessary for configuring such a computing device based on the port configuration.

In addition to determining the commands necessary for configuring each of the multiple computing devices, the system may also determine criteria that indicate whether or not each of the multiple computing devices was configured correctly. The system may then determine whether each of the multiple computing devices was properly configured using the determined criteria. The comparison may be a result of the system receiving a response from the computing device. In such an embodiment, the system may compare the criteria against the received response. In another embodiment, the criteria may be a test comprising test data that the system communicates to the computing device and, an expected response from the computing device as a result of receiving the test data. The system receives a response from each of the multiple computing devices and compares the response with the expected response of the test. Based on such a comparison, the system may determine whether each device of the multiple computing devices was correctly configured.

Next in block 112, the system communicates the commands to each of the multiple computing devices. In some embodiments, the system may communicate the commands to each of the multiple computing devices at the same time. In other embodiments, the system may communicate the commands in a sequential sequence. While in other embodiments, the system may communicate the commands to one of the multiple computing devices at a time.

Once the system determines whether the multiple computing devices were properly configured based on receiving the commands in block 112, the system updates the single software application to display whether the multiple computing devices were properly configured.

Figure 2:
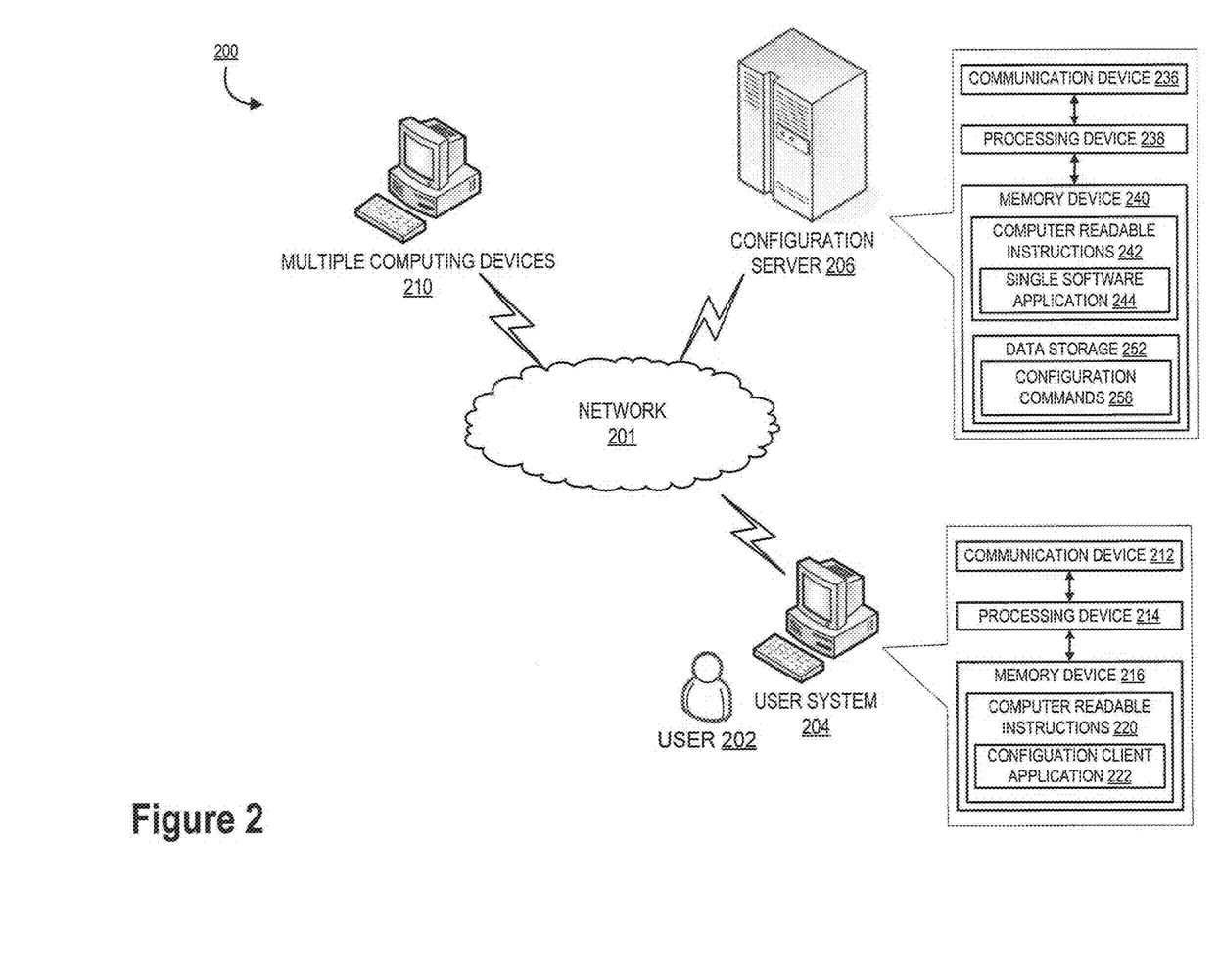
FIG. 2 provides a configuration system environment, in accordance with one embodiment of the present invention.

FIG. 2 illustrates an environment 200 for configuring multiple computing devices, in accordance with one embodiment of the present invention. As illustrated in FIG. 2, the configuration server 206 is operatively coupled, via a network 201 to the user system 204, and to the multiple computing devices 210. In this way, the configuration server 206 can send information to and receive information from the user system 204 and the multiple computing devices 210. FIG. 2 illustrates only one example of an embodiment of an environment for configuring multiple computing devices 206, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the interaction may be made by a user 202 using the user system 204. In some embodiments, the user 202 may be a technician, engineer, employee, agent, associate, independent contractor, and the like that has been granted access to the environment 200 in order to configure the multiple computing devices over the network 201.

FIG. 2 also illustrates the user system 204. The user system 204 generally comprises a communication device 212, a processing device 214, and a memory device 216. The user system 204 is a computing system that allows a user 202 to interact with the configuration server 206 in order to generate reports and configure the multiple computing devices located on the network 201. The processing device 214 is operatively coupled to the communication device 212 and the memory device 216. The processing device 214 uses the communication device 212 to communicate with the network 201 and other devices on the network 201, such as, but not limited to the multiple computing devices 210. As such, the communication device 212 generally comprises a modem, server, or other device for communicating with other devices on the network 201.

The user system 204 comprises computer-readable instructions 220 and data storage 218 stored in the memory device 216, which in one embodiment includes the computer-readable instructions 220 of a configuration client application 222. In this way, a user 202 may interact with the configuration server 206 in order to generate reports and configure the multiple computing devices on the network 201. In some embodiments, the configuration client application 222 may be a web browser which interprets web related files such as Hyper Text Markup Language (HTML), Javascript, Cascading Style Sheets (CSS), Extensible Markup Language (XML), Javascript Object Notation (JSON), and the like. The user system 204 may be, for example, a desktop personal computer, a mobile system, such as a cellular phone, smart phone, personal data assistant (PDA), laptop, or the like. Although only a single user system 204 is depicted in FIG. 2, the environment 200 for configuring computing devices over a network 201 may contain numerous user systems 204, each of which communicates with the configuration server 206. In other embodiments, the user system 204 may be configured to connect to a configuration server 206 on multiple networks.

As further illustrated in FIG. 2, the configuration server 206 generally comprises a communication device 236, a processing device 238, and a memory device 240. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 238 is operatively coupled to the communication device 236 and the memory device 240. The processing device 238 uses the communication device 236 to communicate with the network 201 and other devices on the network 201, such as, but not limited to the user system 204 and the multiple computing devices 210. As such, the communication device 236 generally comprises a modem, server, or other device for communicating with other devices on the network 201.

As further illustrated in FIG. 2, the configuration server 206 comprises computer-readable instructions 242 stored in the memory device 240, which in one embodiment includes the computer-readable instructions 242 of a single software application 244. In some embodiments, the memory device 240 includes data storage 252 for storing commands, executable by a computing device, necessary for configuring such computing device 258.

In the embodiment illustrated in FIG. 2 and described throughout much of this specification, the single software application 244 allows the configuration server 206 to configure computing devices over the network 201 and collect information regarding the configuration of such computing devices for reporting.

The environment 200 may have any number of computing devices 210 wherein each of the multiple computing devices 210 are capable of communicating with at least the other computing devices 210, the configuration server 206, and the user system 204. In some embodiments, the multiple computing devices may comprise different applications to perform specific functions. The ability of the multiple computing devices to communicate over the network 201 is done using a communication device associated with each of the multiple computing devices. Each function may have access to the communication device to both transmit and receive data to other devices over the network 201. In some embodiments, the multiple computing devices 210 may restrict the ability of an application to communicate with certain devices on the network 201.

One of the applications stored on each of the multiple computing devices may be an application for communicating with the configuration server 206 in order to receive commands that are executable by each of the multiple computing devices 210 in order to configure the device. In addition to the application for communicating with the configuration server 206, the multiple computing devices may have an application to execute the commands received by the configuration server. In some embodiments, the commands may be source code that must be compiled by each of the multiple computing devices into machine code prior to being executed by each of the multiple computing devices. In other embodiments, the code may be executable code that may be executed directly by each of the multiple computing devices upon receiving. In yet other embodiments, the code may be a script which is interpreted by a scripting engine. Each of the multiple computing devices may include a scripting engine executed by a processing device of each of the multiple computing devices. The scripting engine may interpret the script and direct the processing device to perform a function based on interpreting the script.

It is understood that the servers, systems, and devices described herein illustrate one embodiment of the invention. It is further understood that one or more of the servers, systems, and devices can be combined in other embodiments and still function in the same or similar way as the embodiments described herein.

Figure 3A:
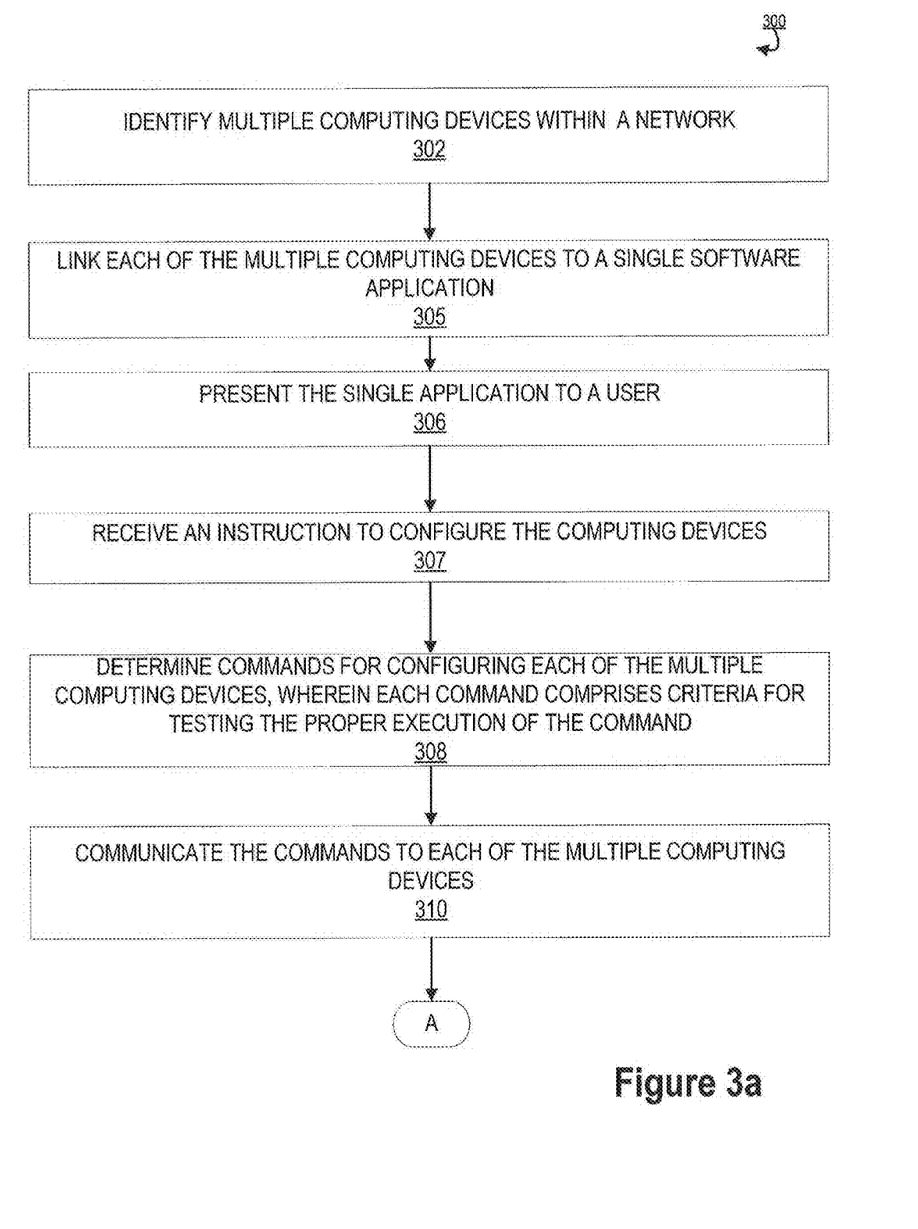
FIG. 3*a* provides a process map illustrating configuring multiple computing devices over a network and testing the configuration of such devices.
Figure 3B:
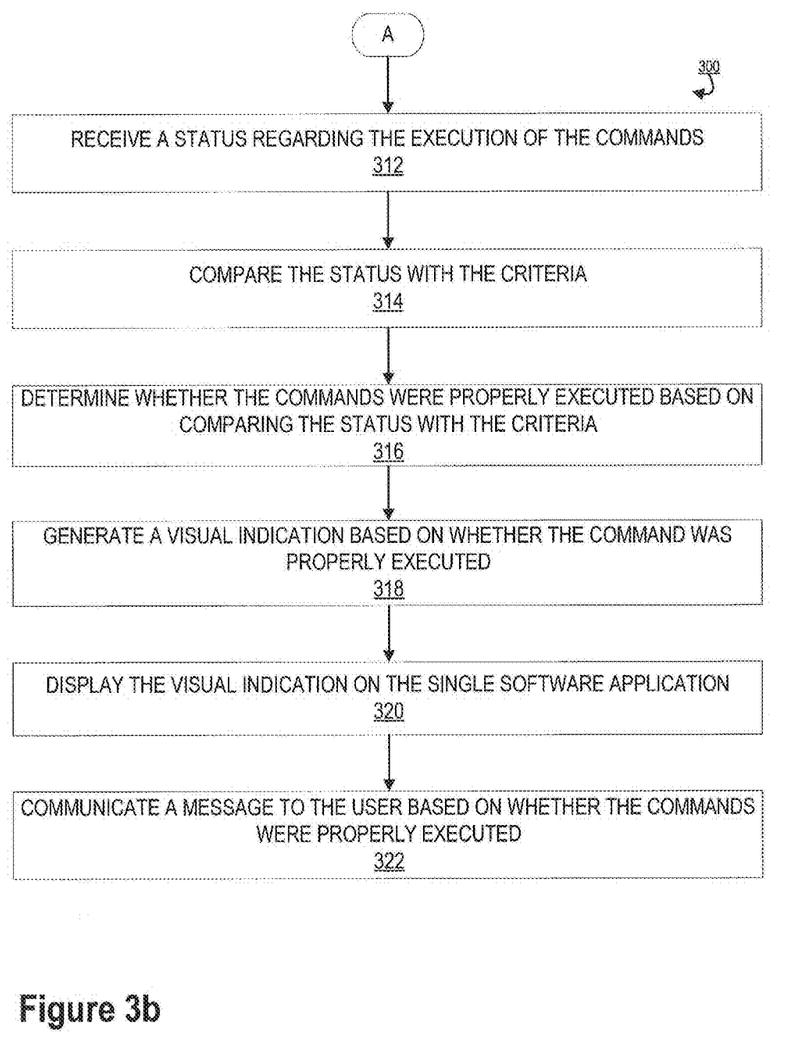
FIG. 3b provides a process map illustrating configuring multiple computing devices over a network and testing the configuration of such computing devices.

FIG. 3a and FIG. 3b illustrate a method for linking multiple computing devices to a single software application 244 in order to configure each of the multiple computing devices using the single software application 244. Block 302 of the method 300 illustrates identifying the multiple computing devices within a network. As explained herein, each of the multiple computing devices 210 may be accessed over the network 201 using a communication device installed within each of the multiple computing devices 210. In some embodiments, each of the multiple computing devices 210 may communicate with one another, the configuration server 206 or the user system 204. Each of the multiple computing devices 210 may comprise an identification routine for presenting information regarding the computing device 210. The identification routine may have access to the communication device of the computing device. The identification routine may receive a request through the communication device. Upon receiving such a request, the identification routine may instruct each of the multiple computing devices 210 to respond with identification information relating to the computing device.

In some embodiments, the identification information may include a computing device identifier such as a MAC address or computing device name. In other embodiments, the identification information may include a network identifier such as an IP Address. In yet other embodiments, the identification information may further include information relating to the architecture of each of the multiple computing devices 210. The architecture may refer to the hardware and/or software of each of the multiple computing devices 210. For example, the hardware may describe information related to the processor, the memory, storage and the like. The software information may relate to the operating system, the BIOS, installed applications and functions, and applications or functions that are being executed by the processor of each of the multiple computing devices 210.

The configuration server 206, as described in block 302 of the method 300, communicates a request to each of the multiple computing devices 210 on the network 201 in order to identify each of the multiple computing devices 210. After the configuration server 206 has properly identified each of the multiple computing devices 210, the configuration server 206 links each of the multiple computing devices to a single software application 244, as illustrated in block 305 in method 300. In some embodiments, the single software application 244 is a web application that is executed on the configuration server 210. The application is accessed using standard web technologies (i.e. web browser). The configuration server 206 may link each of the multiple computing devices 210 by including such computing devices in a list with information relating to the computing devices.

In addition to the list containing information about each of the multiple computing devices 210, the list may further include tools to cause the configuration server 210 to perform a function. These tools may be displayed as part of the single software application 244 such as a button. The functions may include a request to commence configuring the multiple computing devices 210, starting or stopping each of the multiple computing devices, or accessing one of the multiple computing devices.

After the configuration server 206 links the each of the multiple computing devices 210 to the single software application 244, the configuration server may present the single software application 244 to a user 202. Presenting the single software application 244 may be as a result of the user 202 transmitting a request, using the user system 204, to the configuration server 206. The user system 204 may transmit the request over the network 201 to the configuration server 206. Upon receiving the request, the configuration server 206 may transmit the single software application 244 to the user system 204; thereby displaying the single software application 244 to the user 202.

Based on receiving the single software application 244, the user 202 may select the various tools to cause the configuration server 206 to perform various functions. Included is a tool to request that the configuration server 206 configure at least one of the multiple computing devices 210. The user may select the computing devices 210 for configuration. Additionally, included within the single software application 244 is a list of configuration options. For example, the single software application 244 may include a list of configuration options wherein is an option to install a web application on a computing device. The user 202 may select the computing devices to which the application should be installed, and then select the web application from the list of configuration options. After selecting such, the user 202 may submit a request to the configuration server 206 to perform the configuration.

After the user 202 submits such a request, the configuration server, receives the request as is illustrated in block 207 of the method 300. Based on receiving such an instruction, the system then receives commands for configuring the computing devices, illustrated in block 308 of the method 300.

In some embodiments, the configuration server 206 determines the commands to send to each of the multiple computing devices 210 in order to configure such computing device. The configuration server analyzes the identification information of each of the multiple computing devices 210 in order to determine such commands. For example, the configuration server may determine that one of the multiple computing devices uses a Linux operating system, while another computing device uses a Windows operating system. The system determines commands necessary for configuring each of the multiple computing devices based on the operating system. In another embodiment, the configuration server 206 analyzes the hardware configuration of each of the multiple computing devices. The server may review the average processor load or memory load in order to properly configure the computing device. In yet another embodiment, the server 206 analyzes the computing device to ensure that the computing device includes the required dependencies. For example, the server 206 may receive a request to install a given application that requires a given amount of storage be available on the computing device 210. Additionally, the server 206 may determine whether the computing device 210 comprises the required dependent software.

Based on this analysis, the server 206 may determine the necessary commands to configure the computing device. Where the server 206 determines that the computing device 210 does not meet one of the required dependencies, the server 206 may include a command to further configure the computing device in order to meet the dependency. For example, the system may install a required piece of software before configuring the computing device otherwise. Additionally, the server 206 may scan the computing device for low priority data that would prevent the server 206 from properly configuring the computing device 210 based on the computing device not having the adequate amount of storage available. Upon scanning the computing device for low priority data, the server 206 may then remove the low priority data from the computing device in order to free up the storage required to properly configure the computing device.

In some embodiments, the commands further include criteria for testing that the command was properly executed by each of the multiple computing devices, as is further illustrated in block 308 of method 300. In some embodiments, the command may include an instruction for each of the multiple computing devices 210 to communicate a message after the command has been executed. In another embodiment, the configuration server 206 may include an instruction to communicate test data to each of the multiple computing devices 210 after each of the multiple computing devices has executed the command. The test data would be executed by each of the multiple computing devices and return a response. The server 206 may compare an expected result with the actual response in order to determine whether the command was executed by each of the multiple computing devices properly.

In all cases, the configuration server 206 communicates the commands to each of the multiple computing devices in accordance with block 310 of the method 300. After the commands are transmitted, the system may receive the result of the execution of the command for each of the multiple computing devices 210 in accordance with block 310 of the method 300. As a result of receiving the response, the system compares the result with the criteria in accordance with block 314 of the method 300.

In some embodiments, the system may further configure the multiple computing devices based on the comparison of the response and the criteria. For example, where the comparison demonstrates that a computing device was not properly configured as a result of an error, the server 206 may further perform another preconfigured function in order to overcome such error. The function may be automatically preconfigured based on an anticipated response of the computing device. For example, the server 206 may receive an error that a particular module could not be installed on at least one of the multiple computing devices. The system may anticipate an error, and may, as a result of the error, communicate a subsequent command to the at least one computing device that generated the error to overcome the error. Additionally, the server may generate a visual indication as illustrated in block 318 of the method 300, which is displayed on the single software application 244 to the user 202 via the user system 204.

Lastly, the server 206 may communicate a message to the user 202 as to whether the command was properly executed based on the comparison, as is illustrated in block 322 of the method 300. This message may be communicated via the single software application 244. In other embodiments, the message may be communicated using email, SMS, or the like.

Figure 4:
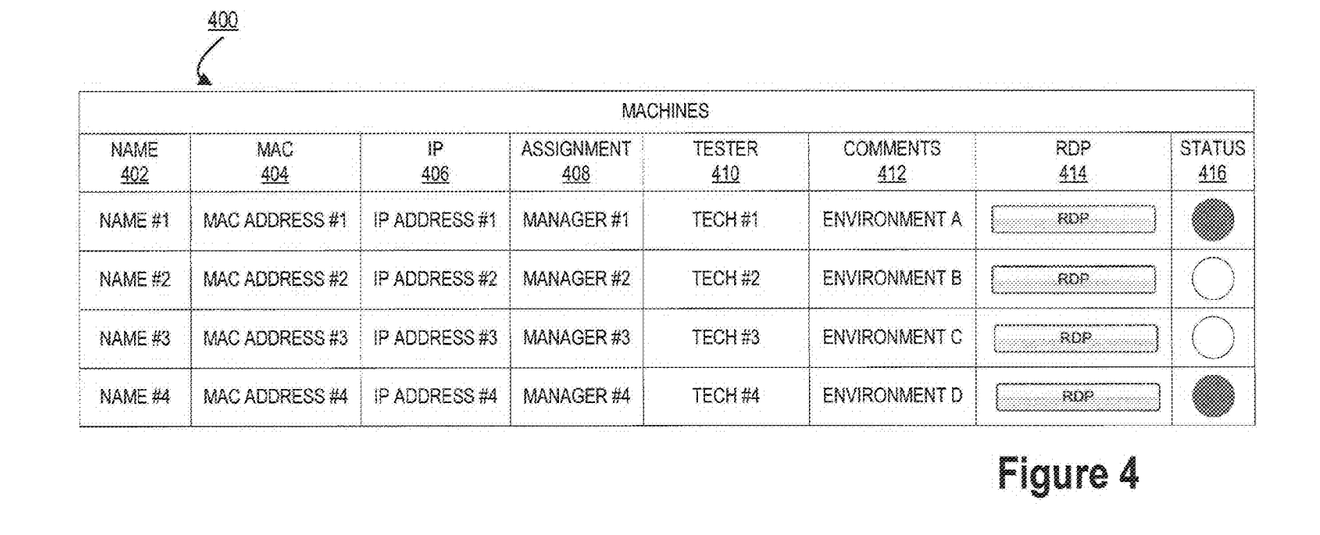
FIG. 4 provides a representative illustration of a list of a single application used to configure multiple computing devices over a network.

FIG. 4 provides a representative display 400 of the single software application 244, in accordance with one embodiment of the present invention. In some embodiments of the invention, the list of computing devices 210 may be represented in a table in display 400. Included within the table are columns 402/404/406 representing identifiers for each of the multiple computing devices 210. These identifiers may include any information for identifying the computing device as defined herein.

Columns 408/410 may describe managers, technicians or users who have responsibility over each of the multiple computing devices 210. Further such information may be used for security purposes. The server 206 may be further configured to receive security credentials from the user 202, which are compared against information located in columns 408/410. The server 206 may further limit communicating commands to each of the multiple computing devices 210 based on such a comparison. Block 412 includes other general comments regarding each of the multiple computing devices.

Block 414 includes a tool, as defined herein, for initiating a session with each of the multiple computing devices. Such a configuration may be performed using any standard protocol, which includes but is not limited to, SSH, Telnet, RDP, Desktop Sharing, and VNC. The server may be configured to communicate the session to the user 202 via the user system 204, thus allowing the user to perform commands directly on each of the multiple computing devices 210 using the user system 204 and thus bypassing the configuration server 206.

Block 416 of the display 400 includes status information related to the server as is defined herein. This may include the state of the computing device 210 (i.e. running, shutdown). It may further include information regarding the configuration of the computing device (i.e. whether an error was received, i.e.).

Figure 5:
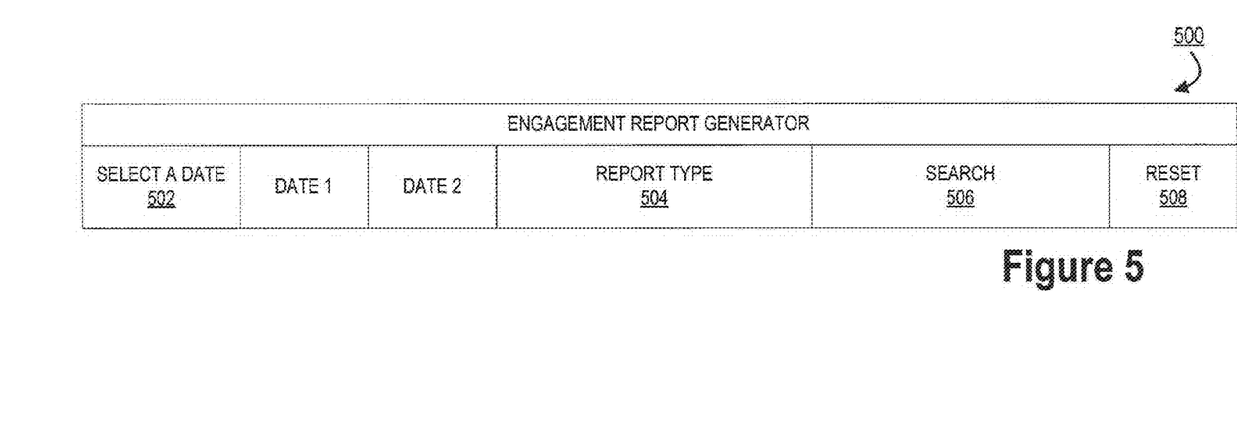
FIG. 5 provides a representative illustration of a report generator for submitting a report request to display information related to the configuration of multiple computing devices.

FIG. 5 illustrates a report generator 500 that is communicated to the user 202 using the single software application 244. The server 206 may further be configured to store related to the configuration process of each of the multiple computing devices 210. The user 202 may access such information by submitting a request to the server 206 using the report generator 500. Included in the report is the ability to select a date range for the report as is demonstrated in block 502 of the report generator 500. Additionally, where there are multiple types of reports, the user may select a given report type as is illustrated in block 504. Such report types may be by periodicity (i.e. daily, monthly, etc.). In other embodiments, the report type may be based by user 202, or by a group. Finally the report generator 500 includes tools for submitting the report request to the server 206 using the tool 206 and resetting the report using the block 508.

Figure 6:
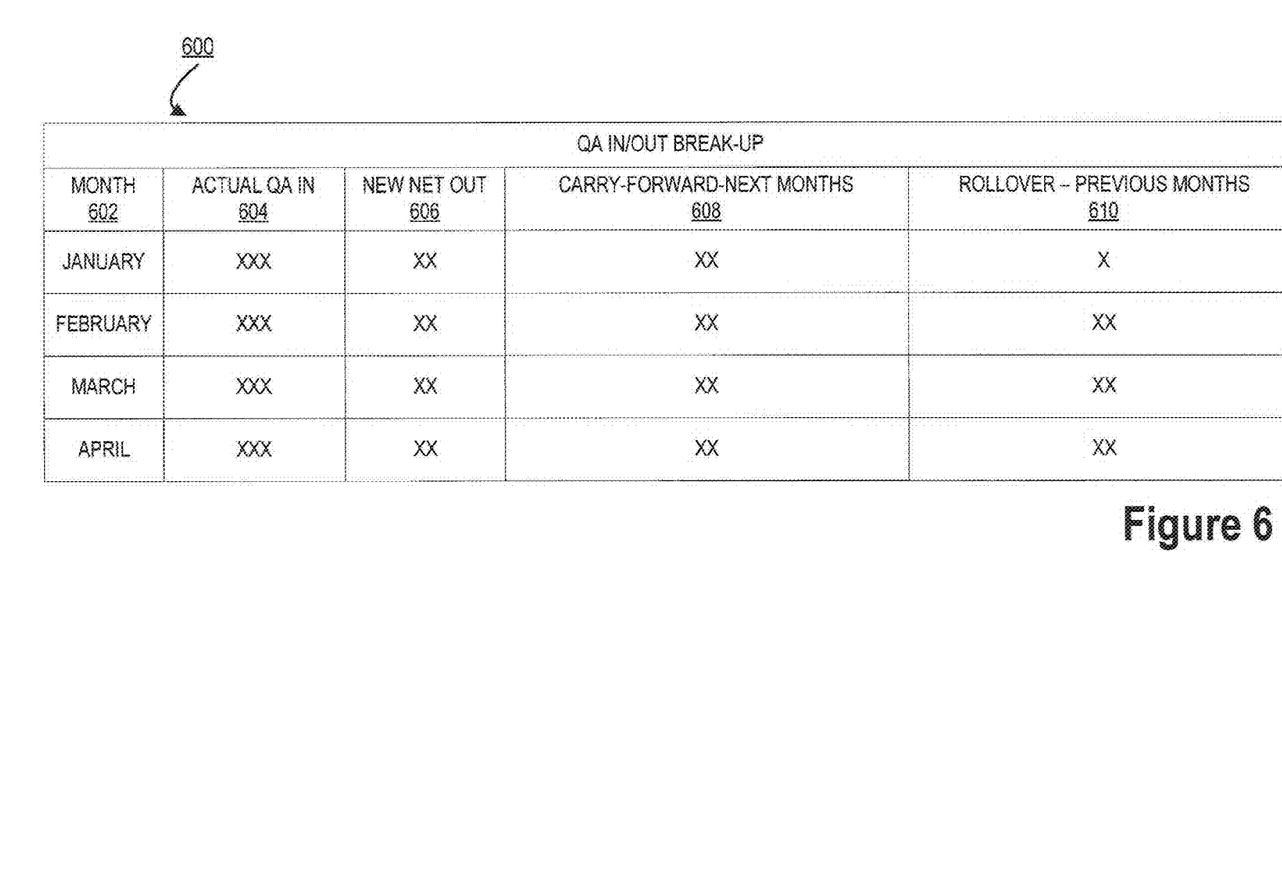
FIG. 6 provides a representative illustration of a report based on submitting a report request to the single application.

As illustrated in FIG. 6, after the system receives a request to generate a report, the system may generate and display a report 600. Included in such a report may be the periodicity as illustrated in block 602 of the report 600. In addition, the report may demonstrate other reportable data as is illustrated in blocks 604/606/608/610.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for configuring multiple computing devices over a network from a single software application, the system comprising:
   a non-transitory storage device;
   a communication device;
   one or more processing devices operatively coupled to the storage device and the communication device;
   at least one module stored in said storage device and comprising instruction code that is executable by the one or more processors and configured to cause said one or more processors to:
      identify the multiple computing devices over the network, wherein the computing devices are accessible over the network, and wherein each of the computing devices comprises a hardware configuration;
      link each of the computing devices to the single software application, wherein the single software application comprises a feature to communicate an instruction to configure each of the computing devices;
      receive the instruction to configure each of the multiple computing devices, based on user input in the single software application;
      determine commands that are executable by each of the multiple computing devices to configure each of the multiple computing devices, wherein the determination of commands is based on the instruction received from the user to configure each of the multiple computing devices and the hardware configuration associated with each of the multiple computing devices;
      determine criteria that indicate whether a computing device has been correctly configured;
      communicate the commands to each of the multiple computing devices to configure each of the multiple computing devices, wherein prior to communicating the commands to configure the multiple computing devices, the multiple computing devices are preconfigured to perform a function; wherein the instruction further comprises additional criteria to determine that the ability of each of the multiple computing devices to perform the function after being configured has not been interrupted;
      receive a status regarding configuration from each of the multiple computing devices based on communicating the commands;
      compare the status of the configuration of each of the multiple computing devices with the criteria;
      receive a status of the ability of each of the multiple computing devices to perform the function;
      compare the additional criteria with the ability of each of the computing devices to perform the function;
      determine whether each of the multiple computing devices was configured correctly based on comparing the status of the configuration of each of the multiple computing devices with the criteria; and
      provide an electronically viewable indication on the single software application as to whether each of the multiple computing devices was configured correctly.

2. The system of claim 1, wherein said module further comprises instruction code for causing said one or more processors to:

receive an indication that one or more of the multiple computing devices generated a configuration error during the configuration of the multiple computing devices;

identify a technician for correcting the configuration error; and electronically communicate the error to the technician.

3. The system of claim 1, wherein said module further comprises instruction code for causing said one or more processors to:

present an option to initiate a remote session with a computing device in the multiple computing devices using the single software application;

receive a request to initiate a session with the computing device; and initiate the session with the computing device based on receiving the request.

4. The system of claim 1, wherein said module further comprises instruction code for causing said one or more processors to authenticate the user; and wherein presenting the single software application is based on authenticating the user.

5. The system of claim 1, wherein each computing device of the multiple computing devices comprises a computing device identification, and wherein identifying each of the multiple computing devices is based on the computing device identification.

6. The system of claim 1, wherein a first computing device of the multiple computing devices comprises an operating environment that is different than that of a second computing device of the multiple computing devices; and wherein the instruction code for sending commands comprise a first set of commands for configuring the first computing device and a second set of commands for configuring the second computing device based on the difference in the operating environments.

7. A computer program product for configuring multiple computing devices over a network from a single software application, the computer program product comprising at least one non-transitory computer-readable medium having computer-readable program code portions embodied therein, the computer-readable program code portions comprising:

an executable portion for identifying the multiple computing devices over the network, wherein the computing devices are accessible over the network, and wherein each of the computing devices comprises a hardware configuration;

an executable portion for linking each of the computing devices to the single software application, wherein the single software application comprises a feature to communicate an instruction to configure each of the computing devices;

an executable portion for receiving the instruction to configure each of the multiple computing devices, based on user input in the single software application;

an executable portion for determining commands that are executable by each of the multiple computing devices to configure each of the multiple computing devices, wherein the determination of commands is based on the instruction received from the user to configure each of the multiple computing devices and the hardware configuration associated with each of the multiple computing devices;

an executable portion for determining criteria that indicate whether a computing device has been correctly configured;

an executable portion for communicating the commands to each of the multiple computing devices to configure each of the multiple computing devices, wherein prior to communicating the commands to configure the multiple computing devices, the multiple computing devices are preconfigured to perform a function; wherein the instruction further comprises additional criteria to determine that the ability of each of the multiple computing devices to perform the function after being configured has not been interrupted;

an executable portion for receiving a status regarding configuration from each of the multiple computing devices based on communicating the commands; and an executable portion for comparing the status of the configuration of each of the multiple computing devices with the criteria;

an executable portion for receiving a status of the ability of each of the multiple computing devices to perform the function;

an executable portion for comparing the additional criteria with the ability of each of the computing devices to perform the function;

an executable portion for determining whether each of the multiple computing devices was configured correctly based on comparing the status of the configuration of each of the multiple computing devices with the criteria; and an executable portion for providing an electronically viewable indication on the single software application as to whether each of the multiple computing devices was configured correctly.

8. The computer program product of claim 7, wherein the computer-readable program code portions further comprises:

an executable portion for receiving an indication that one or more of the multiple computing devices generated a configuration error during the configuration of the multiple computing devices;

an executable portion for identifying a technician for correcting the configuration error; and an executable portion for communicating the error to the technician.

9. The computer program product of claim 7, wherein the computer-readable program code portions comprises:

an executable portion for presenting an option to initiate a remote session with a computing device in the multiple computing devices using the single software application;

an executable portion for receiving a request to initiate a session with the computing device; and an executable portion for initiating the session with the computing device based on receiving the request.

10. The computer program product of claim 7, wherein the computer-readable program code portions further comprises an executable portion for authenticating the user; and wherein presenting the single software application is based on authenticating the user.

11. The computer program product of claim 7, wherein each computing device of the multiple computing devices comprises a computing device identification, and wherein identifying each of the multiple computing devices is based on the computing device identification.

12. The computer program product of claim 7, wherein a first computing device of the multiple computing devices comprises an operating environment that is different than that of a second computing device of the multiple computing devices; and wherein the instruction code for sending commands comprise a first set of commands for configuring the first computing device and a second set of commands for configuring the second computing device based on the difference in the operating environments.

13. A computer-implemented method for configuring multiple computing devices over a network from a single software application, the computer-implemented method comprising:
   identifying the multiple computing devices over the network, wherein the computing devices are accessible over the network, and wherein each of the computing devices comprises a hardware configuration;
   linking each of the computing devices to the single software application, wherein the single software application comprises a feature to communicate an instruction to configure each of the computing devices;
   receiving the instruction to configure each of the multiple computing devices, based on user input in the single software application;
   determining commands that are executable by each of the multiple computing devices to configure each of the multiple computing devices, wherein the determination of commands is based on the instruction received from the user to configure each of the multiple computing devices and the hardware configuration associated with each of the multiple computing devices;
   determining criteria that indicate whether a computing device has been correctly configured;
   communicating the commands to each of the multiple computing devices to configure each of the multiple computing devices, wherein prior to communicating the commands to configure the multiple computing devices, the multiple computing devices are preconfigured to perform a function; wherein the instruction further comprises additional criteria to determine that the ability of each of the multiple computing devices to perform the function after being configured has not been interrupted;
   receiving a status regarding configuration from each of the multiple computing devices based on communicating the commands; and
   comparing the status of the configuration of each of the multiple computing devices with the criteria;
   receiving a status of the ability of each of the multiple computing devices to perform the function;
   comparing the additional criteria with the ability of each of the computing devices to perform the function;
   determining whether each of the multiple computing devices was configured correctly based on comparing the status of the configuration of each of the multiple computing devices with the criteria; and
   providing an electronically viewable indication on the single software application as to whether each of the multiple computing devices was configured correctly.

14. The computer-implemented method of claim 13, wherein the method further comprises:
   receiving an indication that one or more of the multiple computing devices generated a configuration error during the configuration of the multiple computing devices;
   identifying a technician for correcting the configuration error; and
   communicating the error to the technician.

15. The computer-implemented method of claim 13, wherein the method further comprises:
   presenting an option to initiate a remote session with a computing device in the multiple computing devices using the single application;
   receiving a request to initiate a session with the computing device; and
   initiating the session with the computing device based on receiving the request.

16. The computer-implemented method of claim 13, wherein the method further comprises authenticating the user; and wherein presenting the single application is based on authenticating the user.

17. The computer-implemented method of claim 13, wherein each computing device of the multiple computing devices comprises a computing device identification, and wherein identifying each of the multiple computing devices is based on the computing device identification.

* * * * *